United States Patent [19]

Dill, III et al.

[11] 4,026,601

[45] May 31, 1977

[54] AIR SUSPENSION SEAT ASSEMBLY

[75] Inventors: John L. Dill, III, Mansfield; Othar P. Kennedy, Jr., Mount Vernon, both of Ohio

[73] Assignee: National Seating Company, Mansfield, Ohio

[22] Filed: June 23, 1975

[21] Appl. No.: 589,568

[52] U.S. Cl. .................. 297/345; 248/400
[51] Int. Cl.² .......................... A47C 1/02
[58] Field of Search ........ 297/345, 348, 347, 307; 248/400, 430

[56] References Cited

UNITED STATES PATENTS

| | | | |
|---|---|---|---|
| 519,884 | 5/1894 | Browne | 297/347 X |
| 1,770,321 | 7/1930 | Mougeotte | 297/307 X |
| 2,216,348 | 10/1940 | Hunsicker | 297/348 X |
| 2,859,063 | 11/1958 | Underland | 297/348 X |
| 3,405,901 | 10/1968 | Gregoire | 248/400 |
| 3,545,716 | 12/1970 | Colautti | 248/430 |
| 3,954,245 | 5/1976 | Costin | 297/345 |
| 3,954,298 | 5/1976 | Lowe | 297/345 |

*Primary Examiner*—James T. McCall
*Attorney, Agent, or Firm*—Donnelly, Maky, Renner & Otto

[57] ABSTRACT

A seat assembly for use in vehicles includes an air spring suspension system, positioned behind the seat back, selectively operative vertically to move the seat relative to the vehicle a distance twice that of the air spring expansion movement. The seat is mounted on a movable frame that is supported by the suspension system from a fixed frame connected to the vehicle, with the travel of the movable frame being rectilinearly guided by rollers carried by the suspension system being received in trackways defined by cooperating channels on the fixed and movable frames.

13 Claims, 7 Drawing Figures

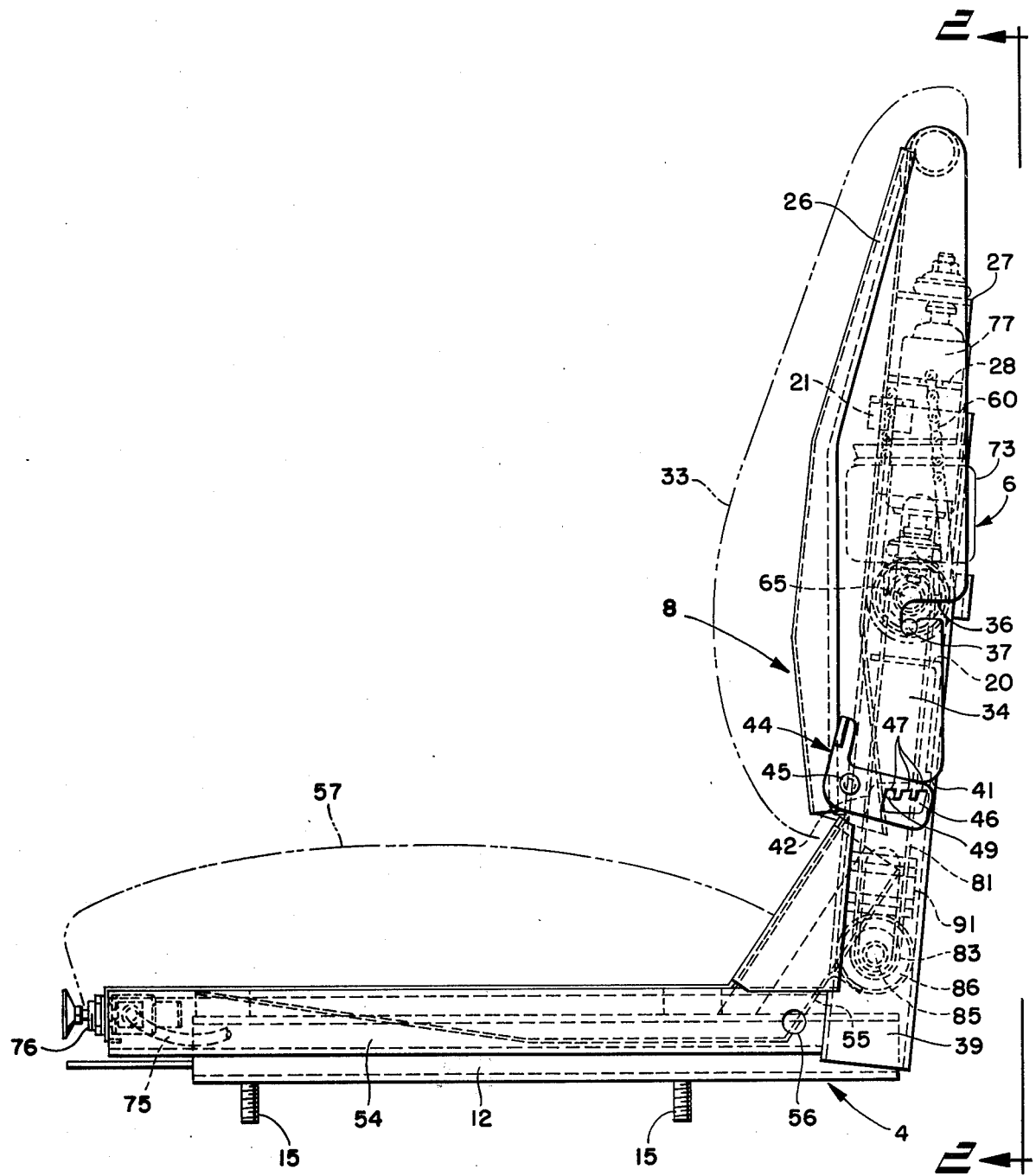

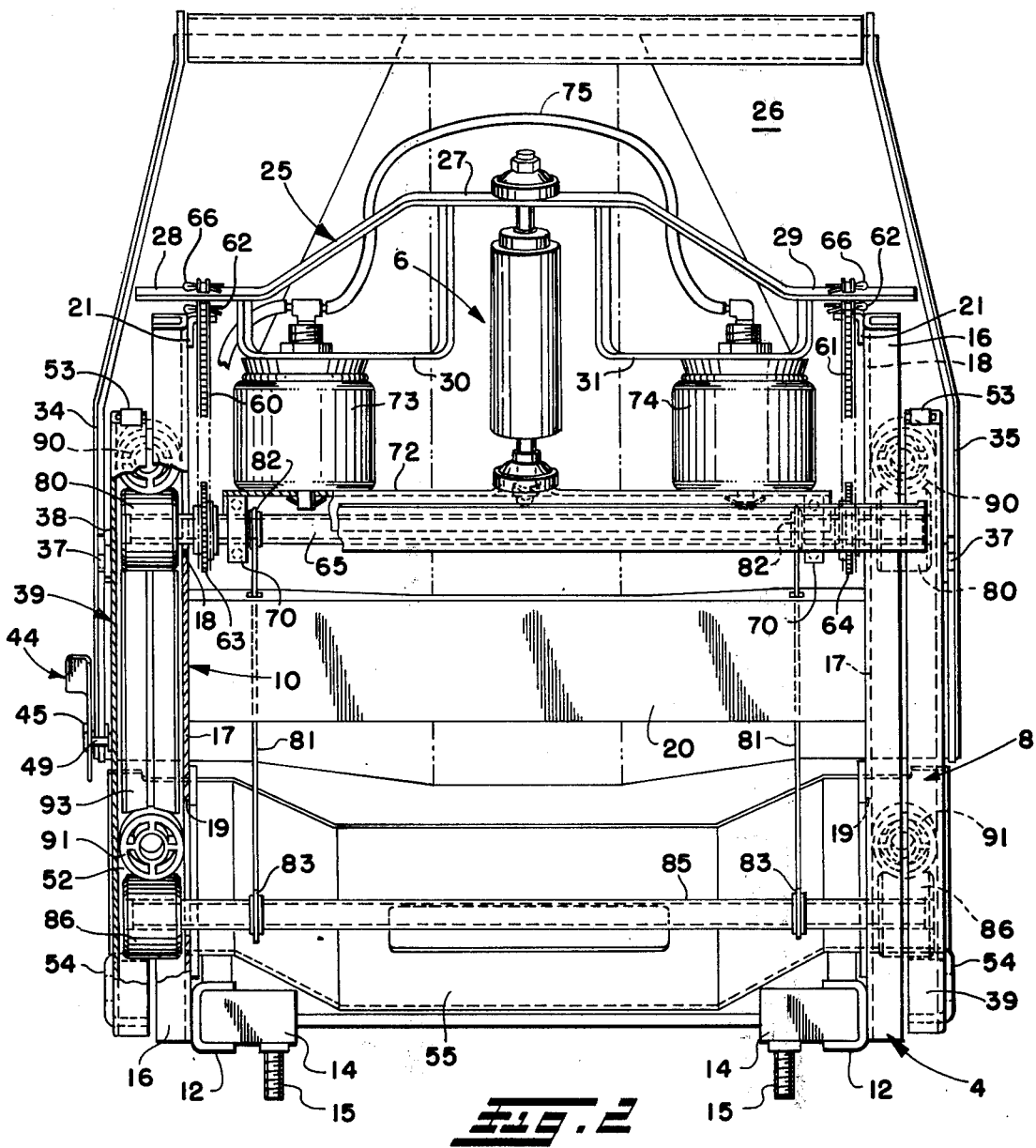
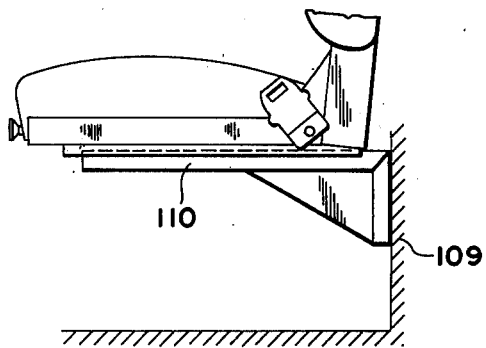
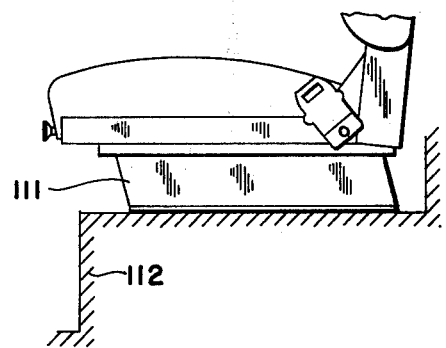

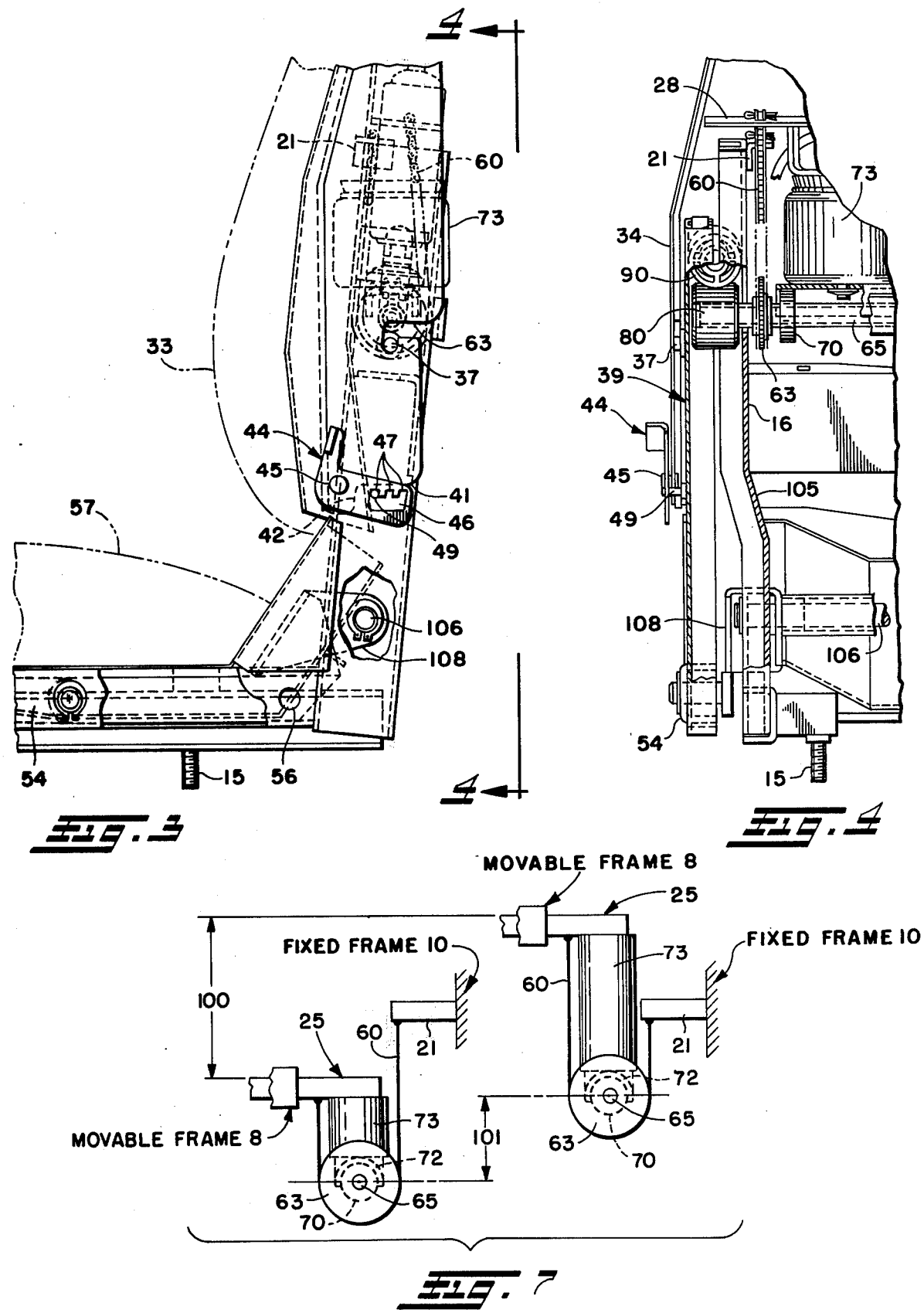

AIR SUSPENSION SEAT ASSEMBLY

BACKGROUND OF THE INVENTION

The present invention relates as indicated to an air suspension seat assembly for use in vehicles, such as trucks and buses.

In the past, pneumatic spring supporting systems have been employed to absorb the shock and vibratory loads encountered in normal use of such vehicles. Conventionally, the opposed ends of the fluid spring were respectively directly connected to the vehicle floor and seat frame whereby the vertical adjustability of the seat was limited to the vertical adjustability of the fluid spring itself. In such systems, the seat assemblies were often rather extensive in height because of the rather extensive vertical dimension of the fluid spring support assemblies, whereby the use thereof was often limited because of head room restrictions in the vehicle cab.

To alleviate some of the above-noted problems, Dome U.S. Pat. No. 3,298,654, assigned to the predecessor in interest of the assignee of the present application, disclosed and claimed a vehicle seat support having a vertically movable base frame beneath the seat cooperating with the fluid spring to provide vertical adjustment of the seat a distance substantially in excess of the vertical adjustability of the fluid spring itself. Such vehicle seat support eliminated many of the problems inherent in the earlier fluid supporting systems and has long been satisfactorily commercially used.

However, the placement of the seat support structure beneath the seat itself, even with the noted increased seat travel characteristics of the Dome patented structure, requires a certain degree of vertical clearance that is often times not present in the limited volume vehicle cabs. Moreover, the subjacent base frame assembly does not have sufficient rigidity to withstand the seat belt loading requirements set by the Department of Transportation, which thus requires tether straps connected to the vehicle to be used for compliance. The base support structure also adds to the overall weight of the vehicle seat. Finally, the distance from the passenger's center of gravity when seated to the mounting location at the bottom of the base support causes relatively high side to side inertial thrusts during use resulting in suspension wear and thus some transverse looseness in the frame.

With the above in mind, the seat assembly of the present invention minimizes the rough ride of a vehicle by using the principles of air suspension seats shown in the Dome patent, while improving certain structural and functional aspects of the subjacent base support structure shown in such patent. Specifically, the primary object of the present invention is to provide an air suspension system for a seat with such air suspension system being located behind the seat back.

Another object of the invention is to provide a lightweight seat contained within a very limited space both horizontally and vertically.

It is still another object of the present invention to provide an air suspension seat assembly that substantially eliminates side to side or transverse looseness.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings:

FIG. 1 is a side elevation of the air suspension seat assembly of the present invention;

FIG. 2 is a rear elevation taken substantially along line 2—2 of FIG. 1, with portions broken away for clarity of illustration;

FIG. 3 is a partial side elevation similar to FIG. 1 showing a second embodiment of the invention;

FIG. 4 is a partial rear elevation taken substantially along line 4—4 of FIG. 3;

FIG. 5 is a schematic showing the seat assembly of the present invention cantilevered from the back wall of a vehicle cab;

FIG. 6 is a schematic similar to FIG. 5 showing the seat of the present invention mounted on a riser which in turn is secured to the floor of the vehicle cab;

FIG. 7 is a two part schematic comparing the vertical extent of movable frame travel from bottom to top with the vertical extent of the air spring travel from bottom to top.

DESCRIPTION OF FIRST EMBODIMENT

Referring now in more detail to the drawings and initially to FIG. 1, the seat assembly of the present invention includes a fixed frame, indicated generally at 4, that is secured directly or indirectly to the vehicle. An air suspension system, indicated generally at 6, is connected to the fixed frame 4 and is operative to support a vertically movable frame 8 carrying the seat. The air suspension system, located behind the seat back, may be selectively actuated to adjust the vertical position of the seat by controlling the degree of air spring inflation, with the travel of the movable frame being twice that of the air spring travel. Such vertical travel of the movable frame is rectilinear and parallel with respect to the fixed frame, with such travel being controlled by a guidance and stability system, indicated generally at 10, between the component parts of the seat assembly.

For ease of reference, the individual components described above and the overall operation will be separately discussed. As used herein, the term "longitudinal" describes an orientation fore and aft of the vehicle and the term "transverse" describes an orientation from side to side of the vehicle.

The Fixed Frame 4

Referring now to FIGS. 1 and 2, the fixed frame 4 includes two parallel transversely spaced and longitudinally oriented inwardly turned channels 12, which are mounted through bearings to transversely spaced, parallel rails 14. Four diagonally opposed, downwardly depending threaded studs 15 are secured to rails 14 to provide for attachment to the vehicle as will be described in more detail hereinafter in context with FIGS. 5 and 6. The entire fixed frame can be adjusted fore and aft through the ball bearing mount of channels 12 to rails 14, but the fixed frame is rigidly held in the selected position of adjustment during seat use.

The fixed frame 10 further includes a pair of laterally spaced upwardly extending channels 16 which face outwardly, such channels being connected adjacent their bottoms to the opposed webs of horizontally oriented channels 12. The web 17 of each channel 16 is provided with two vertically spaced elongated slots 18 and 19, with the slots in the spaced webs 17 of the two channels 16 being respectively horizontally aligned. The upwardly extending channels 16 are rigidified by an angle 20 connected thereto and extending therebetween. Finally, the fixed frame includes two L-shaped brackets 21 one of which is connected to each of the webs 17 adjacent the top of channels 16. The fixed frame, just described, supports the vertically movable frame 10 through an air suspension system to be discussed in more detail hereinafter.

The Vertically Movable Frame 8

The movable frame 8 includes a cross support 25 for back pan 26. Such cross support 25 includes an inverted U member 27, two horizontal end flanges 28 and 29, and two upright U-shape supports 30 and 31 interconnecting each of the end flanges 27 and 28 with the base of inverted U member 27.

The back plate 26 includes a contoured central section, which supports the back seat cushion 33, and two rearwardly extending side skirt portions 34 and 35. At about the midpoint of the seat back height, the skirt portions 34 and 35 are provided with L-shape slots 36 which receive outwardly extending weld studs 37 connected to the webs 38 of upwardly extending and transversely spaced channels 39 on the movable frame. Studs 37 and slots 36 form two transversely spaced bayonet connections between channels 39 and the seat back to permit the latter to pivot about studs 37.

The bottom of skirt 34 is provided with a cutout portion 41 which in turn defines a downwardly extending tap 42 on the front bottom portion of skirt 34. An L-shaped back release handle 44 is pivotally connected at 45 to tab 42 on skirt 34 of the back pan. The longest leg of the L-shaped handle 44 extends rearwardly and slightly downwardly and is provided with a slot 46 having notches 47 along the top surface thereof. The handle 44 is normally biased in a clockwise direction about pivot 45 by a gravitational moment caused by the rearwardly and downwardly directed orientation of the longer handle arm. A pin 49, which is connected to the web 38 of upwardly extending channel 39, extends outwardly therefrom and is selectively received in one of the notches 47 of slot 46. Such pin reception in a notch 47 locks the seat back to the channel 39 in a preselected degree of inclination. If adjustment is desired, the handle 44 is manually pivoted counterclockwise as viewed in FIG. 1 to release the pin 49 from the notch 47 to permit pivotal movement of the seat back about the bayonet connection within the confines of the length of slot 46 along which the pin is free to move. When the desired degree of adjustment is attained, the handle 44 is released and rotates in a clockwise direction to recapture the pin 49 in the notch 47 corresponding to the desired inclination position.

The two transversely spaced channels 39, which form part of the movable frame, face inwardly and cooperate with the outwardly facing channels 16 on the fixed frame 10 to define therewith two transversely spaced trackways 52. The tops of channels 39 are each provided with an end cap 53.

A seat cushion pan 55, at its rearward portion, is connected to and extends between transversely spaced channels 39. The forward portion of seat cushion pan 55 extends generally horizontally and is supported by transversely spaced channels 54, which extend forwardly in horizontal cantilever fashion from their connection to the transversely spaced, vertically oriented channels 39. A lap belt anchor 56 is provided in each of the exposed sides of horizontally oriented channels 54. A seat cushion 57 is supported by the contoured seat cushion pan 55. Thus the movable frame consists of the cross support 25, back pan 26, back pan skirts 34, 35, back seat cushion 33, vertically oriented channels 39, horizontally oriented channels 54, seat cushion pan 55 and seat cushion 57. All of such elements vertically move as a unit, although the seat back consisting of the cross support 25, the back pan 26 and the back cushion 33 may be independently angularly adjusted about the bayonet pivot connection. Such vertical movement of frame 8 is selectively controlled by the seat occupant through the air suspension system 6.

The Air Suspension System 6

The air suspension system 6 includes two transversely spaced chains 60 and 61, each having one end thereof connected by cotter pins 62 to the transversely spaced brackets 21 on fixed channels 16. Such chains 60 and 61 extend around and are respectively in mesh with spaced sprockets 63 and 64 mounted on shaft 65. The other ends of chains 60 and 61 are respectively connected by cotter pins 66 to horizontal end portions 29 and 28 of cross support 25 on the movable frame. Although chains and sprockets have been illustrated and described as the connection between the fixed and movable frames, it will be appreciated that other types of flexible tension connections could also be used, for example, cables and pulleys.

Two spaced ball bearing races 70 on shaft 65 support substantially semicircular mounting plate 72. Ball bearing races 70 permit the shaft 65 to rotate relative to mounting support 72. Similarly, such bearing races 70 permit the mounting plate 72 and associated suspension structure to pivot with the cross support 25 relative to the shaft 65 when the seat back inclination position is adjusted.

Two transversely spaced air springs 73 and 74 are respectively positioned between and connected to support plate 72 and U-shape supports 30 and 31 on cross support 25 of the movable frame. Flexible plastic tubing 75 communicates with air springs 73 and 74 selectively to supply pressurized air to or vent air from such springs. The pressurization or depressurization of the air springs 73 and 74 is controlled by a valve 76 in the plastic tubing line 75, with such valve being positioned for convenience adjacent the front of the seat cushion as shown in FIG. 1. Such valve permits the pressurization and thus the expansion of the elastomeric housing of the air spring to be controlled to regulate the position of the vertically movable frame 8 connected to the upper end thereof to any desired heighth between the top and bottom extremes.

A shock absorber 77 is connected to and extends between the mounting plate 72 and the base web member 27 of cross support 25 on the movable frame. As shown, the shock absorber is intermediately positioned between the two air springs 73 and 74 and acts to damp the rebound action of such springs.

The air suspension system 6 thus permits the vertically movable frame 8 to be selectively vertically moved by the occupant to a position providing the desired cushioning effect for his weight and height.

Such vertical movement of the seat is rectilinearly controlled by the guidance and stability system 10.

The Guidance and Stability System 10

The guidance and stability system includes structural members from all three basic seat assembly components; namely, the fixed frame, movable frame and suspension system. Such structural members, as described below, cooperate rectilinearly to guide the travel of the movable frame relative to the fixed frame.

Such guidance and assembly system 10 includes the shaft 65 supporting the semicircular mounting plate. The ends of shaft 65, which extend through the two horizontally aligned, elongated slots 18 in the webs 17 of transversely spaced channels 16, have longitudinally oriented rollers 80 secured thereto. Such rollers 80 are received in the transversely spaced trackways 52 defined by the outwardly facing channels 16 on the fixed frame cooperating with the inwardly facing channels 39 on the movable frame. Two transversely spaced synchronizing straps 81 extend around transversely spaced and vertically aligned bearings 82 and 83 respectively mounted on shafts 65 and 85. Thus, shaft 85, which is below shaft 65, will simultaneously move vertically with shaft 65. The ends of shaft 85 extend through horizontally aligned slots 19 in the webs 17 of transversely spaced channels 16 on the fixed frame. Longitudinally oriented rollers 86 are mounted on the ends of shaft 85 and are thus received in the trackways 52.

The rollers 80 and 86 are of sufficient peripheral width to span parts of both channels 16 and 39 and have an outside diameter that substantially equals the spacing between the legs of channels 16 and channels 39 to insure proper guidance during relative vertical movement. Moreover, the outside diameter of the rollers 80 equals the pitch diameter of the sprockets 63 and 64 to provide substantially frictionless simultaneous movement.

A transversely oriented flexible roller 90 is positioned above and supported by each of the rollers 80 on shaft 65, with the peripheral surfaces of such rollers engaging the opposed webs 17 and 38 of channels 16 and 39 respectively. Similarly, a transversely oriented flexible roller 91 is positioned above and supported by each of the rollers 86 on shaft 85, with the peripheral surface of rollers 91 engaging opposed webs 17 and 38 of channels 16 and 39, respectively. The rollers 90 and 91 are radially inwardly compressed by a predetermined load prior to positioning the same in trackways 52 to eliminate any side to side looseness between the fixed and movable frames.

To maintain proper spacing between rollers 80 and rollers 91, a rigid plastic spacer 93 is positioned in each trackway 52 between the roller 91 and the bottom portion or roller 80. Thus, there is end to end engagement in each of the trackways 52 between roller 86, flexible roller 91, rigid spacer 93, roller 80, synchro strap 81, and flexible roller 90, with such members being captured in trackway 52 by the end cap 53 across the top of each movable channel 39.

The relative movement between the movable frame and fixed frame caused by expansion and contraction of the air springs 73 and 74 is thus rectilinearly guided by the two vertically spaced and simultaneously moved shafts 65 and 85 having rollers 80 and 86 engagingly received for relative movement in the trackways 52 formed by cooperating channels on the fixed and movable frames. Such rectilinear vertical movement is accomplished without side to side movement which is precluded by radially preloading flexible rollers 90 and 91 between the webs of the channels 16 and 39.

The Operation of the Seat Assembly of the First Embodiment

The operation of the seat assembly of the first embodiment can best be described in context with FIG. 7 which includes two sequential schematics. The left schematic shows the fixed frame and movable frame in the relative positions occupied when the air springs are unpressurized while the right schematic discloses the relative positions of the fixed frame and movable frame when the air springs are fully pressurized. The reference numerals used in FIGS. 1 and 2 have been applied to similar parts in FIG. 7.

When valve 76 is manually opened to supply pressurized air to air springs 73 and 74, such springs vertically expand to drive the movable frame 8 upwardly and simultaneously to drive the shafts 65 and 85 and support plate 72 upwardly. Such vertical movement of the movable frame causes the chains 60 and 61 to lift shaft 65 and shaft 85 through synchronization straps 81. The simultaneous movement of shafts 65 and 85 rotates rollers 80 and 86 to permit vertical guidance movement of the same along the channels 16 and 39 on the fixed and movable frames, respectively. Such vertical movement may be selectively manually discontinued by returning valve 76 to its closed position. Downward vertical movement can be initiated by moving the valve to a position to deflate the expandible air springs.

By thus regulating the degree of inflation of the air springs, the seat can be vertically adjusted to the proper height for the driver. By merely adjusting the vertical height, the condition of ride for the driver is automatically set, with the weight of the driver slightly compressing the air springs to provide the desired cushioning effect.

During such adjustment, the total vertical movement 100 of the movable frame is twice the magnitude of the air spring expansion. In other words, the movable frame 8 moves a distance 100 which is the combination of the equal movements 101 of the support plate 72 and the air bag expansion movement. Thus a 2:1 ratio of seat movement to air spring movement is obtained through the reeving assembly including the chains 60 and 61, the sprockets 63 and 64, and the shaft 65. This provides greater vertical movement for the seat while maintaining the air springs within their ranges of resilient expansibility. Moreover, a more desirable ride characteristic is provided by using higher pressure, reduced travel air springs, instead of lower pressure, increased travel air springs.

DESCRIPTION OF THE SECOND EMBODIMENT

Another means for providing parallel or rectilinear vertical movement of the movable frame relative to the fixed frame is illustrated in FIGS. 3 and 4. In such figures, structural elements common between the two embodiments have been identified by the same reference numerals used in FIGS. 1 and 2.

The lower portion of each upwardly extending fixed channel 16 has been inwardly bent as shown at 105. A horizontally extending pivot shaft 106 is rotatably journaled between the inwardly bent portions of opposed channels 16. Two transversely spaced pivoting support arms 108 are respectively connected to the ends of pivot shaft 106. The spaced pivot support arms 108 are also connected to the lower ends of the two horizontally spaced channels 54 on the movable frame. The pivotable movement of pivot support arms 108, in conjunction with shaft 65 and rollers 80, allows the movable frame assembly to travel in a rectilinear parallel vertical direction relative to the fixed frame while providing proper support. Such pivot shaft 106 and spaced pivot support arms 108 in the second embodiment take the place of and perform the same function as the synchronization straps 81, shaft 85, and rollers 86 in the first embodiment.

The operation of the second embodiment for the seat assembly is functionally identical to the first embodiment and thus a description of the same will not be repeated.

SUMMARY OF THE INVENTION

To summarize, by placing the suspension system behind the seat back, as described above, several significant structural advantages are obtained over the air suspension system below the seat. Initially, the seat of the present invention is considerably more compact both horizontally and vertically than conventional seats and is 15 to 35% lighter than currently available seats. The reduced weight is primarily achieved by eliminating the frame structure below the seat in conventional air suspension structures. The compactness and reduced weight permit the seat to be mounted in any one of a number of ways. For example, referring to FIG. 5, the seat can be mounted to the back wall 109 of a vehicle cab by a cantilever frame 110. The vertical compactness and reduced weight of the seat permit such cantilever installation on the frame 110 attached to wall 109. Similarly, a riser 111 can be attached to the seat to provide proper vertical positioning on the floor 112 of a vehicle cab. Finally, the fixed frame can be directly mounted by threaded studs 15 to the vehicle floor.

A second major advantage in the seat of the present invention is the elimination of side to side looseness. The seat assembly of the present invention eliminates this problem in two ways; namely, the seat has a very low profile and center of gravity which reduces the side to side inertial thrusts and the seat has a series of flexible rollers 90 and 91 which are radially compressed by a predetermined preload to be tightly positioned between the fixed and movable frames.

A third major advantage is providing a compact lightweight seat that provides a means of anchoring lap belts directly to the seat frame. Such advantage is accomplished by providing the lap belt anchor on the movable frame which includes channels 39 that cooperate with channels 16 on the fixed frame, such channels being sufficiently strong to withstand large longitudinal and torque loading forces applied to the seat.

Although the invention has been shown and described with respect to two embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A seat assembly for vehicles and the like comprising a fixed frame mounted to the vehicle, a vertically movable frame carrying the seat back and seat cushion, and resilient suspension means connecting the movable frame to the fixed frame, said suspension means including expandable air spring means and a support for one end of said air spring means, said support being relatively movable with respect to both said fixed and movable frames and being guided by said frames, the other end of said air spring being connected to one of said frames, whereby the air spring is operative to provide a cushioning effect during use and is selectively operative to drive the movable frame relative to the fixed frame.

2. The seat assembly of claim 1 further including a means operative rectilinearly to guide and stabilize the travel of the movable frame relative to the fixed frame.

3. The seat assembly of caim 1 wherein the suspension means includes a reeving means selectively operative vertically to move the movable frame a distance twice that of the air spring expansion movement.

4. The seat assembly of claim 3 wherein the reeving means includes at least one fixed length flexible member respectively connected at its opposite ends to the fixed and movable frames, said flexible member intermediate its ends extending around a first shaft which in turn carries said support to which said one end of the air spring means is mounted, whereby expansion or contraction of the air spring means will cause vertical movement of the movable frame and will simultaneously cause equal vertical movement of said shaft and said support.

5. The seat assembly of claim 4 wherein the shaft has a first set of rollers on its ends, with such rollers respectively being received in two transversely spaced trackways formed between cooperating channels on each side of the fixed and movable frames.

6. The seat assembly of claim 5 further including a second shaft positioned below and rotatably connected to the first shaft by synchronization strap means, said second shaft having a second set of rollers received in said trackways, said first and second shafts and sets of rollers acting rectilinearly to guide the movement of the movable frame relative to the fixed frame.

7. seat assembly of claim 5 further including two transversely spaced arms respectively pivotally connected at one end to the fixed frame and connected at the other end to the movable frame, said arms being positioned beneath said first shaft and set of rollers to act in conjunction therewith rectilinearly to guide the movement of the movable frame relative to the fixed frame.

8. The seat assembly of claim 5 further including flexible rollers oriented transversely of the seat, said flexible rollers being slightly radially compressed to be received between and in engagement with the channels on the fixed and movable frames, thereby to eliminte side to side looseness between said frames.

9. The seat assembly of claim 5 wherein the seat back is pivotally connected to the channels on the movable frame to permit angular adjustment of the seat back.

10. The seat assembly of claim 1 wherein the fixed and movable frames have channels on each side thereof cooperating to define therebetween two transversely spaced trackways which receive rollers carried by the suspension means, said rollers rectilinearly guiding the travel of the movable frame relative to the fixed frame.

11. The seat assembly of claim 10 further including at least one radially compressed and transversely oriented flexible roller snugly received in each trackway substantially to eliminate side to side movement between the fixed and movable frames.

12. The seat assembly of claim 1 wherein said suspension means includes a shock absorber to damp the rebound action of said air spring means.

13. The seat assembly of claim 1 wherein the suspension means is positioned behind the seat back.

* * * * *